United States Patent
Mohanraj

(10) Patent No.: US 11,931,717 B2
(45) Date of Patent: Mar. 19, 2024

(54) ARTICLE AND METHOD OF REMOVING MICROPLASTICS AND OIL

(71) Applicant: Snigtha Mohanraj, Ansonia, CT (US)

(72) Inventor: Snigtha Mohanraj, Ansonia, CT (US)

( * ) Notice: Subject to any disclaimer, the term of this patent is extended or adjusted under 35 U.S.C. 154(b) by 200 days.

(21) Appl. No.: 17/536,190

(22) Filed: Nov. 29, 2021

(65) Prior Publication Data

US 2023/0166234 A1 Jun. 1, 2023

(51) Int. Cl.
| | |
|---|---|
| *B01J 20/12* | (2006.01) |
| *B01J 20/06* | (2006.01) |
| *B01J 20/26* | (2006.01) |
| *B01J 20/28* | (2006.01) |
| *C02F 1/28* | (2023.01) |
| *C02F 101/32* | (2006.01) |
| *C02F 103/00* | (2006.01) |

(52) U.S. Cl.
CPC .......... *B01J 20/12* (2013.01); *B01J 20/06* (2013.01); *B01J 20/262* (2013.01); *B01J 20/28045* (2013.01); *C02F 1/281* (2013.01); *C02F 2101/32* (2013.01); *C02F 2103/001* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 6,045,700 A | * | 4/2000 | Heitkamp | C02F 1/288 |
| | | | | 210/692 |
| 7,169,318 B1 | | 1/2007 | Hall | |
| 11,345,615 B2 | * | 5/2022 | Awadh | B01J 20/28061 |
| 2009/0301071 A1 | * | 12/2009 | Dobert | B01D 53/0431 |
| | | | | 123/519 |
| 2014/0187413 A1 | | 7/2014 | Lagaron Cabello et al. | |

OTHER PUBLICATIONS

Tuzen et al., Response surface optimization, kinetic and thermodynamic studies for effective removal of rhodamine B by magnetic AC/CeO2 nanocomposite, Journal of Environmental Management 206 (2018) p. 170-177 (Year: 2018).*

* cited by examiner

*Primary Examiner* — Chester T Barry
(74) *Attorney, Agent, or Firm* — CANTOR COLBURN LLP

(57) ABSTRACT

An article Including a support matrix including a plurality of pores, a metal oxide and a clay, wherein the metal oxide and the clay are disposed on the support matrix or within the plurality of pores of the support matrix, and a method of removing a hydrocarbon fluid and microplastics from an aqueous fluid by immersing the article into the aqueous fluid.

19 Claims, 2 Drawing Sheets

ARTICLE AND METHOD OF REMOVING MICROPLASTICS AND OIL

FIELD OF THE INVENTION

An article and a method for the removal of hydrocarbon fluids and microplastics from aqueous mixtures including the remediation of contaminated water sources.

BACKGROUND

Since it was defined by Science in 2004, microplastics, i.e., plastics that gradually decompose into fragments or particles smaller than 5 mm in size due to physical action, biodegradation, photodegradation and other processes, is a persistent organic pollutant. These particles are often referred to as "microplastics". More recently, microplastics has become a major global environmental and ecological issue along with global climate change and ocean acidification, and is attracting increasing attention from the environmental community.

Most microplastics in the environment result from the breaking down or degradation of consumer and industrial plastics. Microplastics have large specific surface areas, which can serve as carriers for persistent organic pollutants, heavy metals, and pathogenic microorganisms. Moreover, many of the additives used in the production of plastics can be toxic, and therefore, microplastics is not only a primary source of marine pollutant, but also a carrier of toxic pollutants. The polymer components of microplastics can include, for example, polyethylene (PE), polypropylene (PP), polyvinyl chloride (PVC), polyester (PET), polystyrene (PS) and polyamide (PA), and can be divided into terrigenous sources (75% to 90%) and salt water sources (10% to 25%). According to statistics, 129 coastal countries in the world pour about 4.8 to 12.7 million tons of plastic wastes into the oceans each year. East Asian seas have been the worst affected areas with microplastic pollution.

The density separation method is mostly used to extract microplastics from sediments. The microplastics in sediments are separated by flotation or elutriation to reduce the mass (volume) of the treated samples, and then the microplastics in the flotation solution are separated by screening or filtration. Other separation methods include columnar separation units, but such systems can be of relatively high cost and inefficient. However, the separation of microplastics from aqueous media such as seawater is complicated due to the presence of particle sediments as well as the microscopic size, and therefore, they are difficult to remove using conventional water purification processes.

Current Water and Wastewater Treatment Plants (WWTP) remove much of the plastic debris in contaminated water, but microplastics remain in large quantities as a colloidal mixture that does not allow common filtration processes to remove the microplastics. A colloidal mixture, the state where the dispersed particles cannot settle naturally, is formed between microplastic particles and surrounding water molecules. Due to the size of the microplastics, the microplastics are evenly distributed in the water and cannot be easily separated. The colloidal microplastics tend not to settle out from the water because their relatively small size, and the presence of ionic surface charges interact with polar water molecules to stabilize the microplastics in the aqueous mixture.

US 2014/0187413 A1 by Cabello et al. discloses nanocomposite materials comprising nano-clay supports for metal oxide particles which give the materials multi-functional properties. Specific additives based on layers of clays intercalated with metal oxides are reported to provide antimicrobial, oxygen sequestrating, catalytic, self-cleaning, and/or anti-abrasive capacity. Cabello's material may optionally contain other organic, metal, and/or inorganic compounds for compatibilization, dispersion, increased functionality of the metal oxides, and/or new functionalities, both passive of physical strengthening and active, such as biocide character, antioxidant, and chemical absorbency. Cabello's clay may incorporate oxides of Zn, Zr, Ce, Ti, Mg, Mn, Pd, Al, Fe, Cu, Mo, Cr, Va, or Co.

SUMMARY OF THE INVENTION

In an embodiment, an article including a support matrix including a plurality of pores, a metal oxide and a clay, wherein the metal oxide and the clay are disposed on the support matrix or within the plurality of pores of the support matrix.

In an embodiment, a method of removing a hydrocarbon fluid and microplastics from an aqueous fluid, the method including:
  immersing an article into the aqueous fluid so that a portion of the hydrocarbon fluid, a portion of the microplastics, and a portion of the aqueous fluid, become adsorbed onto or within the article, wherein the article comprises a support matrix including a plurality of pores, a metal oxide and a clay, wherein the metal oxide and the clay are disposed on the support matrix or within the plurality of pores of the support matrix; and
  separating the adsorbed hydrocarbon fluid, microplastics, and aqueous fluid from the article by compression of the article, wherein a concentration of the separated hydrocarbon fluid and a concentration of the separated microplastics in the separated aqueous fluid is greater than the concentration of the of the hydrocarbon fluid and the microplastics in the aqueous fluid.

BRIEF DESCRIPTION OF THE FIGURES

The above and other aspects, features, and advantages of certain embodiments of the disclosure will be more apparent from the following description taken in conjunction with the accompanying drawings, in which.

DESCRIPTION OF THE INVENTION

Figure 1:
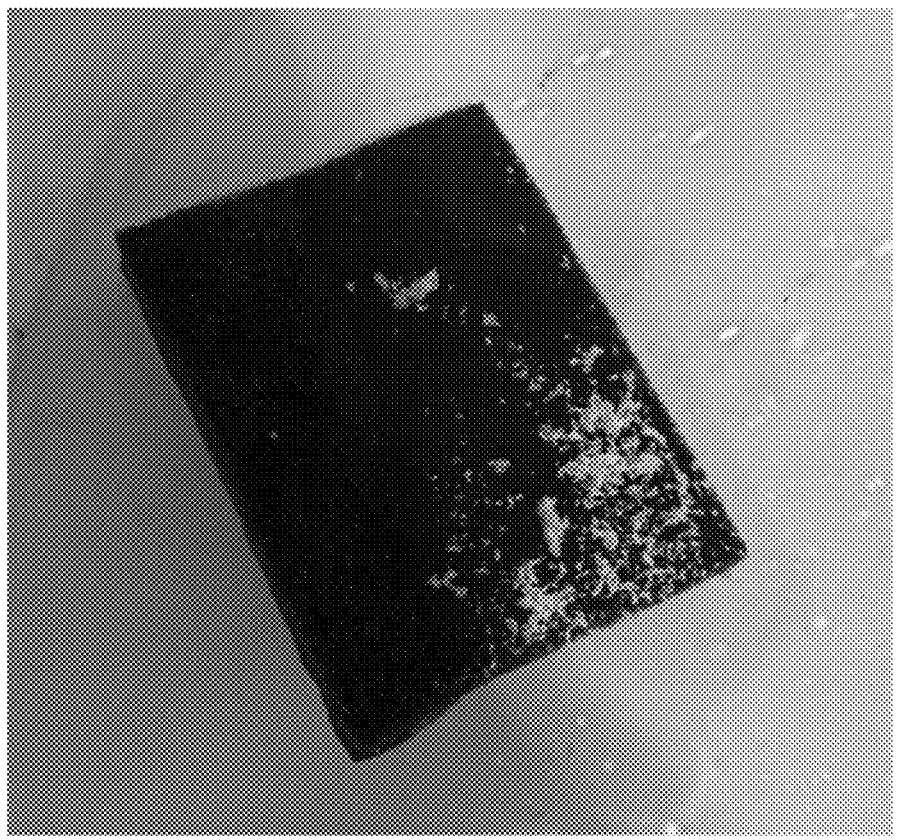
FIG. 1 is a photograph of the sponge article prepared in accordance with Example 4 showing the attachment of microplastics to the article.

Microplastics and hydrocarbon fluids, e.g., fossil fuels or oils, are presently found in many global water sources, and thus, presents a major health and environmental concerns. Microplastics pose health hazards to humans and other organisms, and negatively-impact the environment. Microplastics can also transport toxins associated with the manufacture of the plastics. Runoff hydrocarbon fluids, e.g., fossil fuels or oils, also poses a huge problem in stormwater, which can end up as our drinking water. There are currently no methods to effectively remove both microplastics and hydrocarbon fluids in an environmentally-friendly and cost-effective process.

A recent attempt of adding natural-sourced coagulants to microplastic contaminated water to help aggregate the microplastics into clumps, which then can be removed simple filtration processes. Although such natural coagulants are inexpensive, nontoxic, and abundant, the effectiveness of these natural coagulants is not as effective as known inorganic coagulants, and which are not as environmentally acceptable. This prompted the present work to find an alternate solution where the removal of the microplastics can be implemented in commercial and household applications, and would be cost effective and environmentally acceptable.

Accordingly, we describe an article that includes a matrix-supported material including a metal oxide and a clay-material, and a method of removing microplastics and hydrocarbon from aqueous sources, e.g., coastal waters, inland rivers, and other wetland environments as well as industrial waste streams. The article provides an efficient, cost-effective, environmentally-friendly means of removing both the microplastics and hydrocarbon fluids from such water sources by concentrating the microplastics and hydrocarbons, hereafter, plastic/oil contaminants, onto or within the article, and then removing or separating the plastic/oil contaminants from the article. The separated plastic/oil contaminants can then be disposed of using well known methods in the art such as with chemical or biological degradation processes. Moreover, the article can be used again and again, i.e., recycled, to remove additional plastic/oil contaminants from environmental or industrial water sources.

In an embodiment, we describe an article including a support matrix including a plurality of pores, a metal oxide and a clay, wherein the metal oxide and the clay are disposed on the support matrix or within the plurality of pores of the support matrix.

In an embodiment, the metal oxide is an oxide of a first-row transition metal, a second-row transition metal, or a combination thereof. For example, the metal oxide may include an oxide of titanium, vanadium, manganese, iron, cobalt, nickel, zinc, zirconium, molybdenum, or a combination thereof. The metal oxide may include or consist essentially of iron oxide.

In an embodiment, the metal oxide, e.g., in the form of a powder, may be initially provided as a metal precursor of the oxide that is to be intercalated in the clay. The precursors include metal alkoxides or organic and/or inorganic salts of metals such as silver, copper, iron, cerium, cobalt, tin, manganese, magnesium, palladium, titanium, nickel, zirconium, zinc or other metals, more preferably the metals are iron, cerium, palladium, titanium, tin, magnesium, zinc and zirconium, particularly iron. In this way, the metal oxide particles are obtained from the metal precursor and may be supported on the clay as well as the support matrix. Methods of making clay-metal oxide composite clays is well known to those in the art. For example, the metal oxide composite clay may be carried out, without limitation, by a sol-gel process, chemical precipitation or hydrolysis by the addition of acids, bases, oxidizing substances, reduction and subsequent total or partial oxidation, or solvents, hydrothermal precipitation, electrodeposition, annealing at high temperatures (100 to 1000° C.), UV radiation, infrared radiation and/or microwave radiation. On concluding any of these treatments the degree of oxidation of the metal shall be modified, totally or partially, forming the metal oxide, giving the composite clay active or passive properties.

Clays

In any of the embodiments disclosed herein, the clay can be a phyllosilicate such as smectite clay minerals, e.g., montmorillonite, particularly sodium montmorillonite; magnesium montmorillonite and/or calcium montmorillonite; attapulgite, heat treated attapulgite, nontronite; beidellite; volkonskoite; hectorite; saponite; sauconite; sobockite; stevensite; svinfordite; vermiculite; palygorskite; kaolinite; sepiolite and the like. Other useful layered materials include micaceous minerals, such as illite, clintonite, muscovite, biotite and the like and mixed layered illite/smectite minerals, such as rectorite, tarosovite, ledikite and admixtures of illites with the clays named above.

Exemplary types of clays include, but are not limited to, smectite, kaolin, illite, chlorite, sepiolite, attapulgite, or some other type. Smectites include dioctahedral smectites such as montmorillonite, nontronite, bentonite, and beidellite, as well as trioctahedral smectites such as saponite, hectorite, and stevensite. In general, dioctahedral smectites have an average of 2 of every 3 octahedral sites occupied by a cation, while trioctahedral smectites have approximately all 3 of every 3 octahedral sites occupied by a cation. Kaolins include the minerals kaolinite, dickite, halloysite, and nacrite. Illites include clay-micas and illite. Chlorites include baileychlore, chamosite, clinochlore, cookeite, donbassite, gonyerite, nimite, odinite, orthochamosite, pennantite, ripidolite, and sudoite. Preferably, the clay is a smectite clay. The smectite clay may be a natural clay or a synthetic clay.

In a preferred embodiment, the smectite clay is montmorillonite or bentonite. Structurally, montmorillonite has a dioctahedral structure. This means the two higher charged aluminum cations occupy two octahedral sites between the $SiO_4$ tetrahedral layers and offers $6^+$ charges in the structure represented by $Na_{0.33}Al_2Si_4O_{10}(OH)_2$. It is equally envisaged that the clay may contain other clay types as previously specified, preferably other smectite clays. For example, the clay may include a mixture of nontronite, beidellite, saponite, and/or stevensite in addition to or a smectite clay. Alternatively, the clay may include bentonite clay, which contains a mixture of clay species such as montmorillonite, illite, and/or kaolinite. Preferably, the montmorillonite is present in the smectite clay in an amount greater than 50 wt %, preferably greater than 70 wt %, relative to a total weight of the smectite clay.

In an embodiment, the clay is smectite, kaolin, illite, chlorite, sepiolite, attapulgite, or a combination thereof. For example, the clay includes a smectite clay of montmorillonite, nontronite, bentonite, and beidellite, saponite, hectorite, stevensite, or a combination thereof.

In an embodiment the smectite clay includes montmorillonite, nontronite, bentonite, or a combination thereof.

In an embodiment, the clay may be an organophilic clay such that an interaction between organic molecules and clay platelets may produce a more hydrophobic surface on the clay minerals. Moreover, organic molecules such as alkyl ammonium cations can replace the interlayer cations of the clay. Organophilic clays can be produced by reacting ethylene glycol with clay minerals through a grafting process. See, De Paiva, L. B Morales, A. R., and Diaz, F. R. V., 2008, "Organoclays: properties, preparation and applications," Applied clay science, 42(1-2), pp. 8-24; and MacEwan, D. M., Wilson, M., Brindley, G., and Brown, G., 1980, "Interlayer and intercalation complexes of clay minerals,".

The clay may be surface-modified with an organo silane. The surface-modification of the clay with an organo silane may render the surface of the clay more hydrophobic, thereby enhancing adsorption of hydrocarbon fluids such as fossil oils as well as microplastics to the article, and thereby, improving the separation efficiency of such contaminants from an aqueous environment. In various embodiments, the organo silane may be represented by the formula $(XR^1)Si-(OR^2)_3$, wherein $R^1$ and $R^2$ are independently $C_1$-$C_{16}$ alkylene, and X is hydrogen or $-NH_2$. Moreover, if X is $-NH_2$, the amine group may enhance the interaction between the clay and the support matrix, and therefore, improve upon the lifetime stability of the article.

In an embodiment, the organo silane may a trimethoxy aminoalkyl silane. In one example, the trimethoxy aminoalkyl silane may be 3-aminopropyl-trimethoxysilane. Alternatively, the organo silane may be a triethoxy alkyl silane. For example, the triethoxy alkyl silane may be triethoxy (octyl) silane.

The clay may further comprise an organic silicate. The organic silicate may be represented by the formula $Si-(OR_3)_4$, wherein R is $C_1$-$C_{20}$ alkyl. In one example, the organic silicate is tetraethyl orthosilicate (TEOS).

In an embodiment, the clay may be surface-modified with one or more mono-quaternary amine compounds and/or one or more di-quaternary amine compounds. For example, the modified clay sorbent can be modified with a di-quaternary amine compound or with a blend of a mono-quaternary amine compound and a di-quaternary amine compound. The surface-modified clays may have improved sorbent capacity for fluorinate or perfluorinated organic compounds even in the presence of the hydrocarbon fluids and microplastics.

The modified clay sorbents can be made by reacting a clay with one or more quaternary amine compounds or blend of quaternary amine compounds. The reaction is done under conditions to intercalate the clay with the one or more quaternary amine compounds. Surface modification of a clay with a quaternary amine compound can be done according to any know methods in the art, including wet processing methods and dry, extrusion based methods. In embodiments, the reaction can include mixing approximately 1 molecule of quat per exchangeable cation in the clay. For example, the quaternary amine compound or compound blends can be mixed with water and then clay can be added to the mixture to react the clay with the multi-functional quaternary amine compounds. The mixture can then be dried and ground into granules or a powder for use.

In an embodiment, the metal oxide and the clay is provided as an aqueous mixture that is then applied to the support matrix, and the volume unit ratio of the metal oxide to the clay in the aqueous mixture is in a range from 1:1 to 3:1, based on 16 volume units of water.

The adsorptive properties of the article will depend in-part on the pore size and pore size distribution of the support matrix. For example, a crystalline zeolite has a comparatively narrow pore size distribution and a polar surface; an amorphous silica gel has a comparatively broad pore size distribution and a polar surface; and a carbon molecular sieve is comparatively narrow in pore size distribution with a nonpolar surface. These principal characteristics for many adsorbents have been successfully engineered to permit the selective adsorption of components from fluids. One common method of using an adsorbent is to simply place it in contact with a fluid containing one or more contaminants that need to be adsorbed, and to then separate and isolate the adsorbed contaminants.

The article includes a support matrix in a form of a woven or nonwoven plastic fabric or textile, or a woven or felt textile such as a cotton, flax, hemp, linen, or wool material, or a paper material, which may be cellulosic or inorganic—in a form of a sheet, strip, or string; a gauze, mesh or screen material such as made with the foregoing materials, a woven or nonwoven yarn; a synthetic open-celled foam, for example, of polyurethane, which may be a reticulate foam; a natural or artificial sponge; and so forth. Any convenient size may be selected for the support matrix. A sheet form of the support matrix may have a substantial length and width in comparison to its thickness, e.g., about from half a foot (0.1524 of a meter) to twenty-five or fifty feet (7.62 meters or 15.24 meters) in length and a comparable dimension or less in width.

The support matrix may be a water-insoluble polymer. As described in Hall, U.S. Pat. No. 7,169,318 B 1, in citation of Hall et al., U.S. Pat. No. 3,750,688—on contact with the organic material the absorbent may swell as it is absorbed or imbibed. A wide variety of polymeric materials may be uses as the support matrix including polymers of styrenes and substituted styrenes; copolymers of vinyl chloride including a copolymer of sixty weight percent vinyl chloride and forty weight percent vinyl acetate; vinylidene chloride copolymers including a copolymer of seventy-five percent vinylidene chloride and twenty-five percent acrylonitrile; acrylic polymers such as polymers of methyl methacrylate, ethyl acrylate, and so forth and the like.

In still a further aspect, the present invention provides a method of synthesis of a biocompatible and biodegradable polyurethane foam including the steps of: reacting at least one polyol with at least one aliphatic polyisocyanate to form an isocyanate-terminated prepolymer; mixing water, at least one stabilizer, at least one cell opener and at least one polyol to form a resin mix; contacting the resin mix with the prepolymer to form a reactive liquid mixture; and reacting the reactive liquid mixture to form a polyurethane foam. Polyether and polyester polyols are useful for preparing prepolymers. Polyester polyols are preferred. Prepolymers having a percent free NCO content of 1 to 35% are useful. Prepolymers having a percent free NCO content of 5 to 30% are preferred.

Surprisingly, the present inventors have found that biocompatible and biodegradable polyurethane foams can be prepared from biocompatible and/or non-toxic components, such as aliphatic diisocyanates, resorbable polyester polyols, tertiary amine catalysts, and lipid-based stabilizers and cell openers. Despite the 7 to 10-fold lower reactivity of aliphatic diisocyanates (and other aliphatic polyisocyanates) relative to aromatic isocyanates, biocompatible and biodegradable polyurethane foams that are highly porous and fast-rising have been prepared.

We also describe a method of removing a hydrocarbon fluid and microplastics from an aqueous fluid, the method including:

immersing an article into the aqueous fluid so that a portion of the hydrocarbon fluid, a portion of the microplastics, and a portion of the aqueous fluid, become adsorbed onto or within the article, wherein the article comprises a support matrix including a plurality of pores, a metal oxide and a clay, wherein the metal oxide and the clay are disposed on the support matrix or within the plurality of pores of the support matrix; and separating the adsorbed hydrocarbon fluid, microplastics, and aqueous fluid from the article by compression of the article, wherein a concentration of the separated hydrocarbon fluid and a concentration of the separated microplastics in the separated aqueous fluid is greater than the concentration of the of the hydrocarbon fluid and the microplastics in the aqueous fluid.

In an embodiment, the concentration of the separated hydrocarbon fluid, or the concentration of the separated microplastics, in the separated aqueous fluid is at least two times greater, e.g., at least four times greater, than the concentration of the of the hydrocarbon fluid and the microplastics in the aqueous fluid.

In an embodiment, the article, or the method of removing a hydrocarbon fluid and microplastics from an aqueous fluid, includes an oxide of titanium, vanadium, manganese, iron, cobalt, nickel, zinc, zirconium, molybdenum, or a combination thereof, the clay includes a smectite clay of montmorillonite, nontronite, bentonite, and beidellite, saponite, hectorite, stevensite, or a combination thereof, and the support matrix is a compressible polymer matrix.

In an embodiment, the article, or the method of removing a hydrocarbon fluid and microplastics from an aqueous fluid, includes an iron oxide, the clay includes a smectite clay of montmorillonite, bentonite, or a combination thereof, and the support matrix is a compressible polyurethane matrix.

EXAMPLES

Mixture compositions of iron oxide, bentonite, and water were prepared in accordance with Table 1. A polyurethane sponge was submerged into each composition mixture for 120 minutes. The composition treated sponge was placed in the oven at 70° C. for 1 hour until dried. The dried treated sponge was then washed with water to remove excess material that did not bind to the polyurethane sponge. The sponge was again dried in the oven. After about 1 hour the sponge was completely dry, and any additional time would result in partial decomposition (burning) of the article. As indicated, the different mixture compositions of iron oxide, bentonite, and water mixtures were prepared to determine optimal adsorbent concentrations in the article sponge, and these are listed as Example Nos. 1 to 6 in Table 1.

TABLE 1

| Example No. | Iron oxide (tablespoon) | Bentonite (tablespoon) | Microplastics % Removed | Oil % Removed |
|---|---|---|---|---|
| 1 | 0.5 | 0.5 | 10 | 15 |
| 2 | 1 | 0.5 | 20 | 25 |
| 3 | 0.5 | 1 | 30 | 40 |
| 4 | 2 | 1 | 47 | 53 |
| 5 | 2 | 2 | 47 | 54 |
| 6 | 2.5 | 2.5 | 49 | 55 |

Contaminated water samples of distilled water, microplastics (used metal rasp to grind plastic into fine particles), and canola oil were prepared. The Ferro-Sponge article was then submerged into the sample, and the amount of microplastic and oil removed from the sample was determined using turbidity measurements (see below). A control sponge (sponge absent the metal oxide and clay) was submerged into contaminated water samples to provide a baseline measurement. The test sponge was able to absorb a sufficient amount of the oil and microplastics in each sample.

A squeeze of the sponge article released the oil and microparticles. The sponge could then be used again to absorb additional oil and microplastics.

The control sponge was able to remove a bit of the canola oil and a few microplastic pieces, but clearly, the control sponge was not very efficient compared to the article sponge.

A homemade spectrometer was used to measure the turbidity levels of contaminated samples before and after the application of the ferro-sponge. The homemade spectrometer was made following the instructions provided by a Colorado State University YouTube video at https://www.youtube.com/watch?v=oulJg0kiiWA&t=156s. A lamp was placed inside and at one end of a shoe box, which is lined on the inside with black paper. A placeholder for the beaker sample was created in front of the lamp at a 2 inch distance. Light passed through a small slit placed in front of the sample beaker at a 2 inch distance. A USB capable webcam was installed inside the box at the other end at the angle at 45 degrees. Using the small section of the CD, I created a diffraction grating by peeling off the silver lining of the CD and keeping the reflective plastic material. A software programs were installed on my laptop from www.spectralworkbench.org and www.effemm2.de/spectragryph/ to analyze and determine the turbidity in each tested sample.

Figure 2:
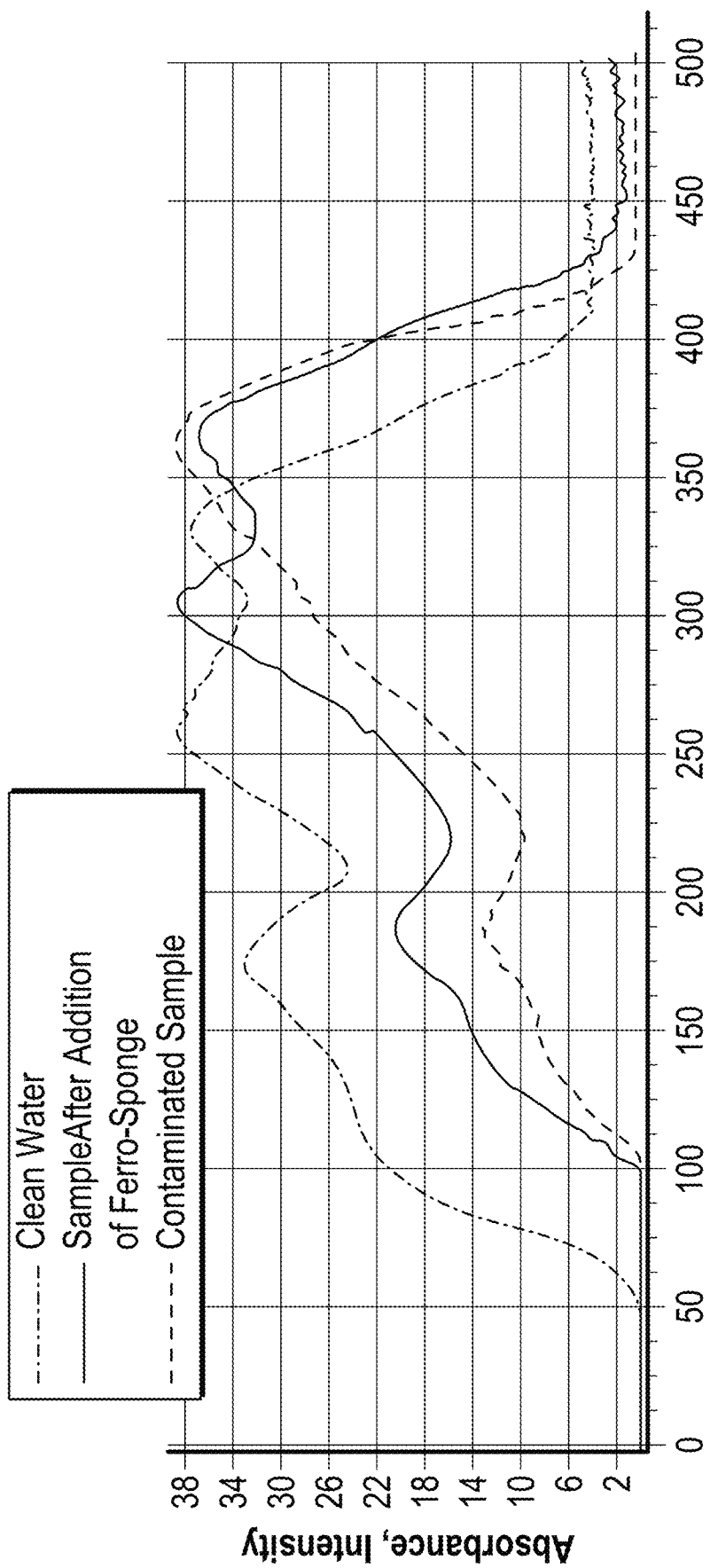
FIG. 2 is a differential spectrum of a water sample to which was a applied an article prepared with the composition of Example 4.

Samples of the water before and after the application of the ferro-sponge usage was collected in a container, and placed inside of the spectrometer. By using a downloaded software, the spectra of the samples were recorded and the turbidity levels determined for each sample. When the lamp was on, the light beam passed through the water. The readings from the spectrometer were displayed on the computer and recorded. This is the control sample. The reading from the spectrometer was recorded. The test was repeated for all other microplastic samples. The spectrum of a clean water sample, a contaminated water sample, and a water sample following adsorption of a portion of the oil and microplastics is shown in FIG. 2.

The use of a digital wife light microscope on can visually see how many microplastic pieces are removed with the ferro-sponge. FIG. 1 is a photograph of the microplastics adhered to the article sponge. After mixing the initial microplastic samples in the distilled water, 2 mL of the microplastic solution were pipetted from the #A1 HDPE beaker onto a 2.5-micron sized filter paper, and the residue was collected on the filter paper. The filter paper, with the residue above it, was transferred onto a petri dish. Once the water dried out of the filter paper, the petri dish was transferred to under the microscope and the number of microplastics that were presented in the sample were counted and recorded. A digital WiFi light microscope which was connected to the phone by using a downloaded program called Inskam was used. Through this app and microscope, the pictures of the samples were captured and clearly counted the number of microplastics presented in each sample. When in doubt, a hot needle was used to test whether the particle is plastic or not. The distilled water was used as the control group with zero microplastics presented.

What is claimed:

1. An article comprising a support matrix including a plurality of pores, a metal oxide and a clay, wherein the metal oxide and the clay are disposed on the support matrix or within the plurality of pores of the support matrix, wherein the support matrix is a compressible polymer matrix.

2. The article of claim 1, wherein the metal oxide is an oxide of a first-row transition metal, a second-row transition metal, or a combination thereof.

3. The article of claim 1, wherein the metal oxide is an oxide of titanium, vanadium, manganese, iron, cobalt, nickel, zinc, zirconium, molybdenum, or a combination thereof.

4. The article of claim 1, wherein the metal oxide and the clay are provided as an aqueous mixture that is then applied to the support matrix, and the volume unit ratio of the metal oxide to the clay in the aqueous mixture is in a range from 1:1 to 3:1, based on 16 volume units of water.

5. The article of claim 1, wherein the clay is smectite, kaolin, illite, chlorite, sepiolite, attapulgite, or a combination thereof.

6. The article of claim 1, wherein the clay includes a smectite clay of montmorillonite, nontronite, bentonite, and beidellite, saponite, hectorite, stevensite, or a combination thereof.

7. The article of claim 6, wherein the smectite clay includes montmorillonite, nontronite, bentonite, or a combination thereof.

8. The article of claim 1, wherein the compressible polymer matrix is a compressible polyurethane matrix.

9. A method of removing a hydrocarbon fluid and microplastics from an aqueous fluid, the method comprising:
   immersing an article into the aqueous fluid so that a portion of the hydrocarbon fluid, a portion of the microplastics, and a portion of the aqueous fluid, become adsorbed onto or within the article,
   wherein the article comprises a support matrix including a plurality of pores, a metal oxide and a clay, wherein the metal oxide and the clay are disposed on the support matrix or within the plurality of pores of the support matrix, and
   separating the adsorbed hydrocarbon fluid, microplastics, and aqueous fluid from the article by compression of the article, wherein a concentration of the separated hydrocarbon fluid and a concentration of the separated microplastics in the separated aqueous fluid is greater than the concentration of the hydrocarbon fluid and the microplastics in the aqueous fluid.

10. The method of claim 9, wherein the concentration of the separated hydrocarbon fluid, or the concentration of the separated microplastics, in the separated aqueous fluid is at least two times greater than the concentration of the hydrocarbon fluid, or the microplastics in the aqueous fluid.

11. The method of claim 9, wherein the concentration of the separated hydrocarbon fluid, or the concentration of the separated microplastics, in the separated aqueous fluid is at least four times greater than the concentration of the hydrocarbon fluid or the microplastics in the aqueous fluid.

12. The method of claim 9, wherein the metal oxide is an oxide of titanium, vanadium, manganese, iron, cobalt, nickel, zinc, zirconium, molybdenum, or a combination thereof, and the clay includes a smectite clay of montmorillonite, nontronite, bentonite, beidellite, saponite, hectorite, stevensite, or a combination thereof.

13. The method of claim 9, wherein the metal oxide includes an iron oxide, the clay includes a smectite clay of montmorillonite, bentonite, or a combination thereof, and the support matrix is a compressible polyurethane matrix.

14. The method of claim 9, wherein the aqueous fluid is selected from the group consisting of coastal waters, inland rivers, wetland environments and industrial waste streams.

15. The article of claim 1, wherein the clay may be surface-modified with one or more mono-quaternary amine compounds, one or more di-quaternary amine compounds, or an organo silane.

16. The article of claim 1, wherein the support matrix is a water-insoluble polymer, a natural or synthetic sponge, or a synthetic open-cell foam.

17. A method of removing microplastics from an aqueous fluid, the method comprising:
   immersing an article into the aqueous fluid so that a portion of the microplastics, and a portion of the aqueous fluid, become adsorbed onto or within the article,
   wherein the article comprises a compressible support matrix including a plurality of pores, a metal oxide and a clay, wherein the metal oxide and the clay are disposed on the support matrix or within the plurality of pores of the support matrix, and
   separating the adsorbed microplastics and aqueous fluid from the article by compression of the article, wherein a concentration of the separated microplastics in the separated aqueous fluid is greater than the concentration of the microplastics in the aqueous fluid.

18. The method of claim 17, wherein the concentration of the separated microplastics in the separated aqueous fluid is at least two times greater than the concentration of the microplastics in the aqueous fluid.

19. The method of claim 17, wherein the metal oxide is an oxide of titanium, vanadium, manganese, iron, cobalt, nickel, zinc, zirconium, molybdenum, or a combination thereof, the clay includes a smectite clay of montmorillonite, nontronite, bentonite, beidellite, saponite, hectorite, stevensite, or a combination thereof, and the support matrix is a compressible polymer matrix.

* * * * *